United States Patent
Patel

(10) Patent No.: US 10,445,700 B1
(45) Date of Patent: Oct. 15, 2019

(54) DATA PROCESSING SYSTEM TO ILLUSTRATE OPERATIONAL STATUS OF A MONITORED SYSTEM

(71) Applicant: Translational Genomics Research Institute (TGen), Phoenix, AZ (US)

(72) Inventor: Apurva Patel, Chandler, AZ (US)

(73) Assignee: The Translantional Genomics Research Institute, Phoenix, AZ (US)

( * ) Notice: Subject to any disclaimer, the term of this patent is extended or adjusted under 35 U.S.C. 154(b) by 1085 days.

(21) Appl. No.: 14/836,125

(22) Filed: Aug. 26, 2015

Related U.S. Application Data

(60) Provisional application No. 62/042,061, filed on Aug. 26, 2014.

(51) Int. Cl.
    *G06Q 10/06*     (2012.01)
    *G06Q 10/10*     (2012.01)

(52) U.S. Cl.
    CPC ....... *G06Q 10/103* (2013.01); *G06Q 10/0631* (2013.01); *G06Q 10/063114* (2013.01); *G06Q 10/1097* (2013.01)

(58) Field of Classification Search
    CPC .. G06Q 10/06; G06Q 10/1097; G06Q 10/103; G06Q 10/063114
See application file for complete search history.

(56) References Cited

U.S. PATENT DOCUMENTS

| | | | |
|---|---|---|---|
| 5,535,322 A | 7/1996 | Hecht | |
| 5,799,297 A | 8/1998 | Goodridge et al. | |
| 5,826,239 A | 10/1998 | Du et al. | |
| 5,930,420 A | 7/1999 | Atkins et al. | |
| 6,237,020 B1 | 5/2001 | Leymann et al. | |
| 6,308,224 B1 | 10/2001 | Leymann et al. | |
| 7,386,535 B1 * | 6/2008 | Kalucha | G06Q 10/06 |
| 8,195,497 B2 * | 6/2012 | Montgomery | G06Q 10/06 705/7.13 |
| 2004/0117231 A1 * | 6/2004 | Jochheim | G06Q 10/10 717/101 |

* cited by examiner

*Primary Examiner* — Brian W Wathen

(57) ABSTRACT

A data processing system executes a board object to drive a Graphical User Interface (GUI) to receive user inputs for the monitored system, and in response, associates the board object with a card object, category object, and user object for the monitored system. The data processing system executes the board object, card object, category object, and user object to drive a Data Distribution System (DDS) to distribute board metadata, card metadata, category metadata, and user metadata among the board object, card object, category object, and user object. The data processing system executes the card object data to determine operational status data based on the board metadata, card metadata, category metadata, and user metadata. The data processing system executes the card object to drive the DDS to distribute operational status data among the board object, category object, and user object and to drive the GUI to illustrate operational status data.

20 Claims, 6 Drawing Sheets

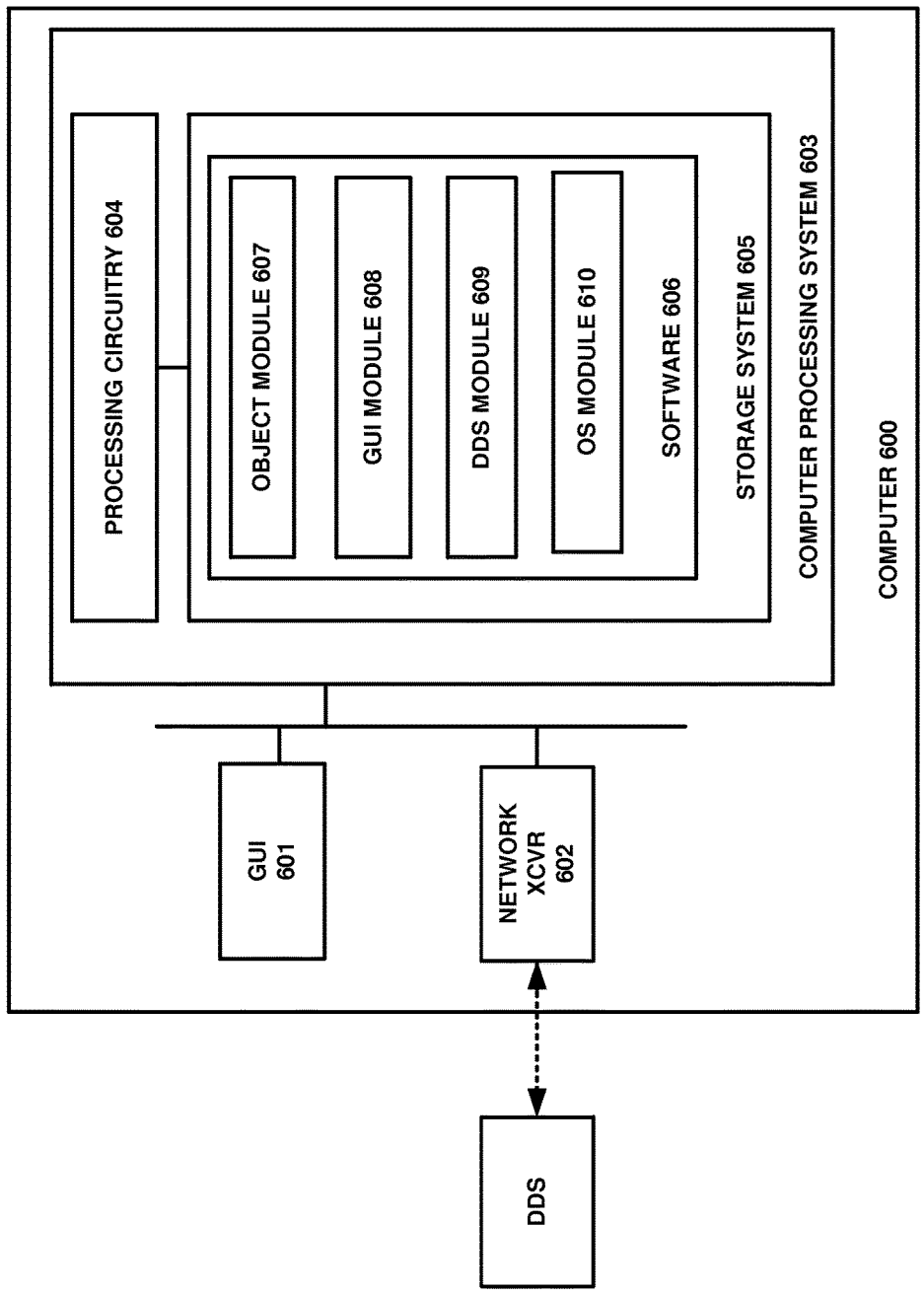

DATA PROCESSING SYSTEM TO ILLUSTRATE OPERATIONAL STATUS OF A MONITORED SYSTEM

RELATED APPLICATIONS

This application claims the benefit of U.S. Provisional Application Ser. No. 62/042,061, filed on Aug. 26, 2014, and entitled "SYSTEMS AND METHODS FOR WORKFLOW ORGANIZATION," which is hereby incorporated by reference in its entirety.

TECHNICAL BACKGROUND

Monitoring systems allow users to process, collect, and analyze data within a distributed system. For example, a medical research process requires monitoring of patient intake, treatments, and outcomes. Another example of a monitoring system could be in an educational institution in which student progress is monitored based on classroom lectures, homework assignments, and tests.

Project management systems have the capability to plan, organize, and manage resources, people, and time constraints. Project management software can include various features including scheduling, quality management, documentation, and budget control. Project management software can be designed to operate in a single user environment or in a multi-user collaborative environment. Often, project planning using project management software requires input data, such as due dates, process durations, resource and budget allocations, and user amounts.

Data Distribution Systems (DDS), such as SharePoint, Dropbox, and OneDrive, allow users to store, access, and distribute data and files among various users on multiple devices. Typically, it is necessary for users participating in a collaborative project to be able to synchronize files and be capable of sharing data with other users and on other systems. Therefore, some project management systems may include a DDS. However, implementing a DDS into a project management system can be expensive and the included DDS may not function as well as a standardized DDS.

TECHNICAL OVERVIEW

A data processing system illustrates operational status of a monitored system. The data processing system executes a board object to drive a Graphical User Interface (GUI) to receive user inputs for the monitored system. In response to the user inputs, the data processing system associates the board object with a card object, a category object, and a user object for the monitored system. The data processing system executes the board object, the card object, the category object, and the user object to drive a Data Distribution System (DDS) to distribute board metadata, card metadata, category data, and user metadata among the board object, the card object, the category object, and the user object. The data processing system executes the card object data to determine operational status data for the monitored system based on the board metadata, the card metadata, the category metadata, and the user metadata. The data processing system executes the card object to drive the DDS to distribute the operational status data among the board object, the category object, and the user object. The data processing system executes the card object to drive the GUI to illustrate the operational status data for the monitored system.

DESCRIPTION OF THE DRAWINGS

FIG. 6 illustrates a computer to illustrate the operational status of a monitored system.

DETAILED DESCRIPTION

Figure 1:
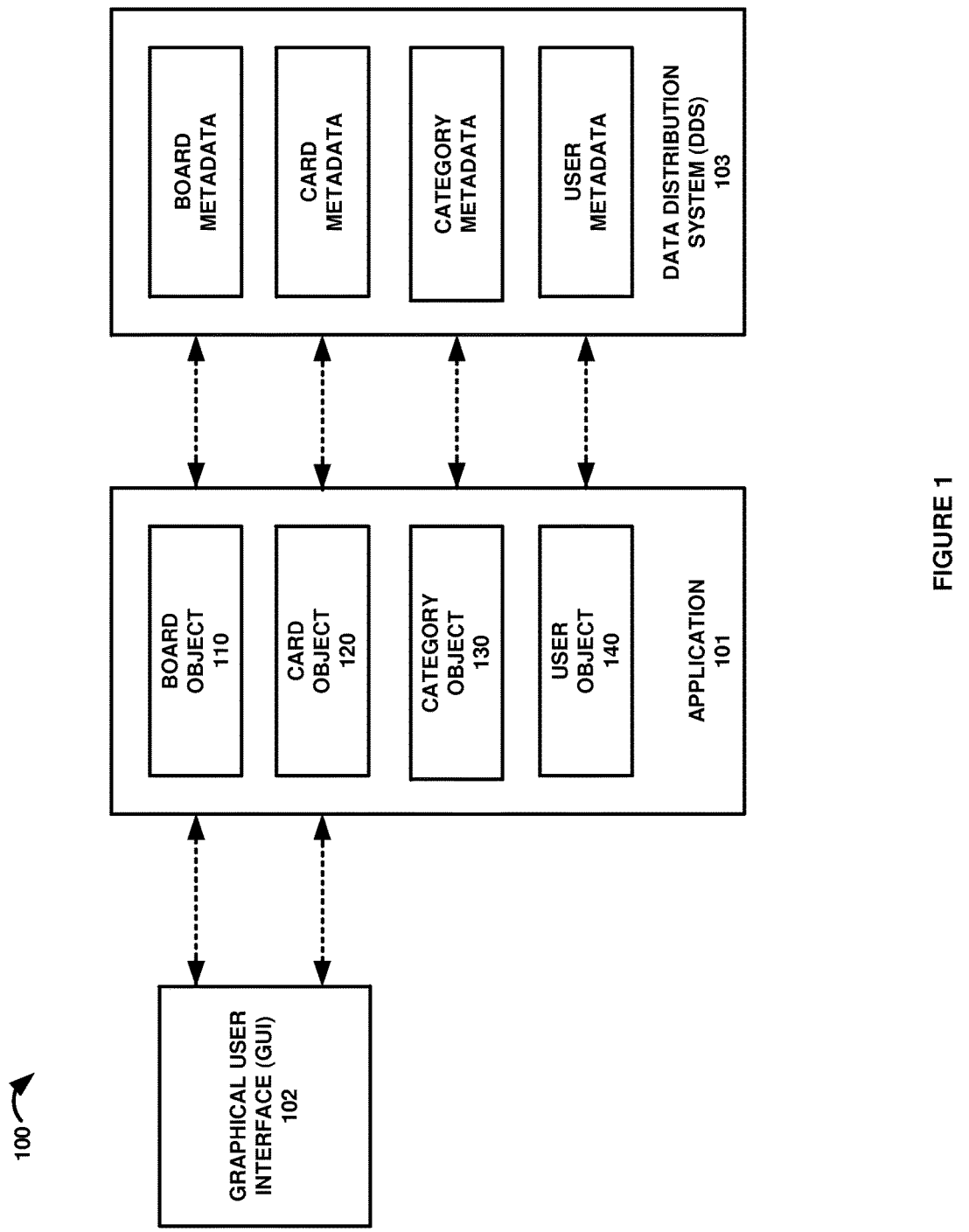
FIGS. 1-4 illustrate a data processing system to illustrate the operational status of a monitored system.

FIGS. 1-4 illustrate data processing system 100 to illustrate the operational status of a monitored system. Referring to FIG. 1, data processing system 100 comprises application 101, Graphical User Interface (GUI) 102, and Data Distribution System (DDS) 103. Application 101 comprises board object 110, card object 120, category object 130, and user object 140.

Advantageously, application 101 drives DDS 103 to illustrate operational status of a monitored system. If desired, DDS 103 can be a standard and cost effective software product. Application 101 and DDS 103 communicate over communication links, such as bus structures, data memories, inter-processor communications, data networks, and the like. For example, application 101 may call DDS 103 Application Programming Interfaces (APIs) through an Operating System (OS) integrated into a standard computer system. Application 101 and GUI 102 exchange data over similar links. For example, application 101 may drive GUI 102 through the OS to illustrate card object 120 and the operating status of its monitoring system.

Data processing system 100 comprises processing circuitry that retrieves and executes operating software from memory. Data processing system 100 may include general purpose central processing units, microprocessors, logic devices, application specific processors, and any other type of processing device.

GUI 102 comprises components that interact with a user, such as a microprocessor, memory, and software. GUI 102 could be a keyboard, display screen, microphone, touch pad, or some other user interface component. User input is entered using GUI 102.

DDS 103 comprises software and a computer system that distributes data between users. For example, a standard DDS may synch data files across a set of user devices of multiple users. DDS 103 includes servers, database systems, communication interfaces, and the like. DDS 103 may store and distribute board metadata, card metadata, category metadata, and user metadata among board object 110, card object 120, category object 130, and user object 140.

Application 101 comprises client-server software modules that execute software objects to perform a group of coordinated functions. Application 101 may be executed on a user device, such as tablet computer, mobile phone, or some other apparatus capable of executing software applications. Application 101 stores board object 110, card object 120, category object 130, and user object 140. In some examples, application 101 and DDS 103 operate on the same computer systems.

Board object 110 includes system control logic and parameters used to create, modify, and share monitoring systems. Board object 110 may comprise titles, descriptions, and control panels. Board object 110 also drives GUI 102 to receive user inputs for the monitored system and associate other objects for the monitored system. For example, a cancer research team performing a study on a particular cancer treatment may create board object 110 to monitor the cancer treatment system patient data.

Card object 120 includes system control logic and parameters used to determine operational status data for the monitored system and drive DDS 103 to distribute the operational status data among other objects for the monitored system. Card object 120 may comprise task logs, user assignments, time limitations, and other operational status data. Card object 120 may also enable user voting functionalities and attachments, such as comments, hyperlinks, zip files, and the like. For example, a cancer research team may associate card object 120 with a task log for a particular patient indicating steps which need to be accomplished before completing the card, such as the steps that need to be completed when performing cancer imaging.

Category object 130 includes control logic and parameters used to indicate system control project phases, performance milestones, and time schedules. Category object 130 may comprise task logs, user assignments, and card object associations. Category object 130 may also enable user voting functionalities and attachments, such as comments, hyperlinks, zip files, and the like. For example, a cancer research team may associate category object 130 with treatment triage phase and time scheduling for when the treatment triage phase is to be completed.

User object 140 includes control logic and parameters used to associate users with card objects 120, category objects 130, and board objects 110. User object 140 may include individual users or groups of users, such as cancer research teams or medical departments. User object 140 may include reporting capabilities to generate user based information within other objects, such as user votes, user assignments, user subscriptions, user schedules and deadlines, and the like. For example, a user may be able to determine upcoming department deadlines, or an administrator may be able to determine which users voted in favor of card object 120.

In operation, data processing system 100 executes board object 110 to drive GUI 102 to receive user inputs for the monitored system, and in response to the user inputs, to associate board object 110 with card object 120, category object 130, and user object 140 for the monitored system. For example, a cancer research staff member inputs data to associate board object 110 with card object 120 containing a patient biopsy assessment, category object 130 containing chemotherapy as a selected treatment, and user object 140 containing patient provider assignments.

In a next operation, data processing system 100 executes board object 110, card object 120, category object 130, and user object 140 to drive DDS 103 to distribute board metadata, card metadata, category metadata, and user metadata among board object 110, card object 120, category object 130, and user object 140. Board object 110, card object 120, category object 130, and user object 140 may call DDS 103 APIs through an OS to define which object is calling for DDS 103 to distribute metadata, the type of metadata requested, and which object should receive the metadata from DDS 103. For example, after the cancer research staff member inputs the data associated with card object 120 containing the patient biopsy assessment, category object 130 containing chemotherapy as the selected treatment, and user object 140 containing patient provider assignments, the data may then be sent to DDS 103 which will distribute the associated metadata to other users, such as medical personnel at a hospital using the metadata from DDS 103 to diagnose and treat patients with a similar stage of cancer and genetic profile.

Data processing system 100 executes card object 120 to determine operational status data for the monitored system based on the board metadata, the card metadata, the category metadata, and the user metadata. For example, the medical personnel at the hospital requesting data may retrieve treatment information based on the cancer research data used for a patient with a similar stage of cancer and genetic profile.

Still referring to FIG. 1, data processing system 100 executes card object 120 to drive DDS 103 to distribute the operational status data among board object 110, card object 120, category object 130, and user object 140. For example, cancer research staff members may subscribe to retrieve updates on data associated with an assigned patient or for all patients participating in a treatment phase.

In a final operation, data processing system 100 executes card object 120 to drive GUI 102 to illustrate the operational status data for the monitored system. For example, a cancer research staff member may be able to see how far a patient is through a particular treatment and which cards have been completed to better analyze data results.

In some examples, GUI 102 illustrates the operational status data for the monitored system by displaying at least one of current card object 120 task log and current category object 130 task log. For example, the operational status may indicate a checklist for carrying out a biopsy procedure for a current card object 120 task log, such as a biopsy assessment procedure list.

In other examples, GUI 102 illustrates the operational status data for the monitored system by displaying progress measurement indicators. The progress measurement indicators may be determined based on due dates, number of days, number of tasks completed, number of associated card objects 120 completed, number of associated category objects 130 completed, or some other progress measurement indication. For example, a cancer research staff member may see that the treatment for a patient in current category object 130 is eighty percent complete based on the number of days the patient has been undergoing a first stage of a chemotherapy treatment.

In other examples, GUI 102 illustrates the operational status data for the monitored system by displaying at least one user assignment for card object 120 and category object 130. For example, a specific department may be assigned to category object 130 for the treatment phase, such as distributing a first round of chemotherapy, but a specific cancer research staff member is assigned to card object 120 for a particular patient or task, such as taking blood samples. A user would then be able to see their user assignments for both the group assignment based on their association with the department for category object 130 and their personal user assignment for the patient or task as indicated on card object 120.

In other examples, GUI 102 illustrates the operational status data for the monitored system by displaying at least one of an entry modification for card object 120 and category object 130. Modifications may be displayed on GUI 102 to those users assigned to category object 130, users subscribed to see modifications to category object 130, groups of users, or all users. Modifications may be displayed for a limited time interval after the modification is made or remain displayed until cleared from the display by users. For example, a user may modify the due date of a treatment phase. Other users assigned to participate in the treatment phase would the be notified on GUI 102 that the due date has changed and could then mark the notification as seen to remove the modification notification from their view on GUI 102.

In some examples, card metadata comprises a task log. For example, the card metadata may indicate that the biopsy has been taken, is currently in the lab, and still needs to be tested. In other examples, card metadata comprises a time limitation. For example, the card metadata may indicate that the biopsy must be tested within forty-eight hours.

In some examples, the category metadata comprises phase performance values. For example, category metadata for post-operation testing may indicate that seventy percent of the tests have been completed or that the due date for all of the tests is within 5 days.

In some examples, the user metadata comprises user assignments. In other examples, the user metadata comprises user subscriptions. For example, a user may be a cancer research staff member assigned to tasks on card object 120 and category object 130. This user may also want to subscribe to receive notifications of modifications to card object 120 and category object 130.

Figure 2:
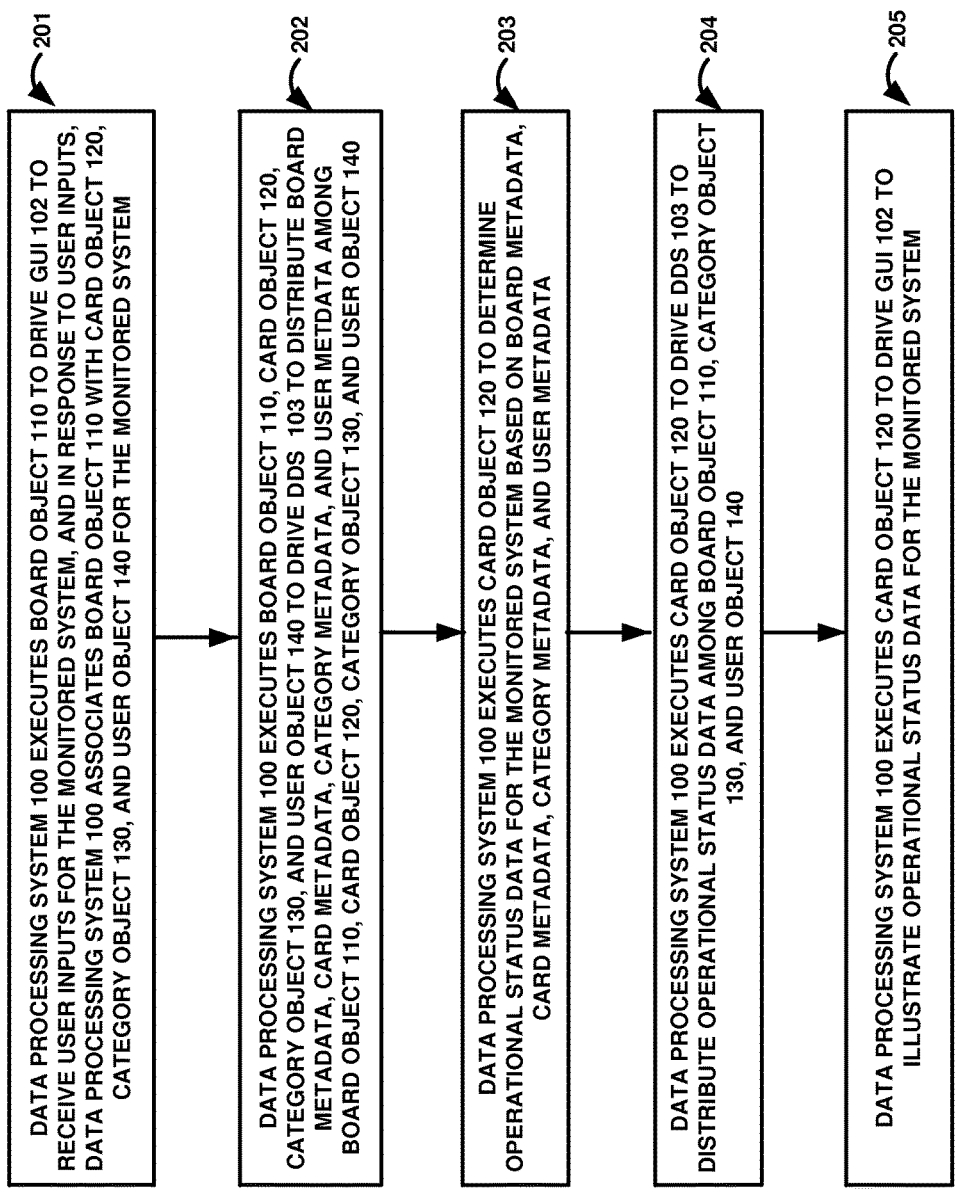

FIG. 2 illustrates a flow diagram of a data processing system to illustrate the operational status of a monitored system. Data processing system 100 executes (201) board object 110 to drive GUI 102 to receive user inputs for the monitored system, and in response to the user inputs, to associate board object 110 with card object 120, category object 130, and user object 140 for the monitored system. Data processing system 100 executes (202) board object 110, card object 120, category object 130, and user object 140 to drive DDS 103 to distribute the board metadata, the card metadata, the category data, and the user metadata among board object 110, card object 120, category object 130, and user object 140.

Data processing system 100 executes (203) card object 120 to determine the operational status data for the monitored system based on the board metadata, the card metadata, the category metadata, and the user metadata. Data processing system 100 executes (204) card object 120 to drive DDS 103 to distribute the operational status data among board object 110, category object 130, and user object 140. Data processing system 100 executes (205) card object 120 to drive GUI 102 to illustrate the operational status data for the monitored system. Advantageously, application 101 may drive DDS 103 to illustrate the operational status of the monitored system, and DDS 103 may be a standard and cost effective product.

Figure 3:
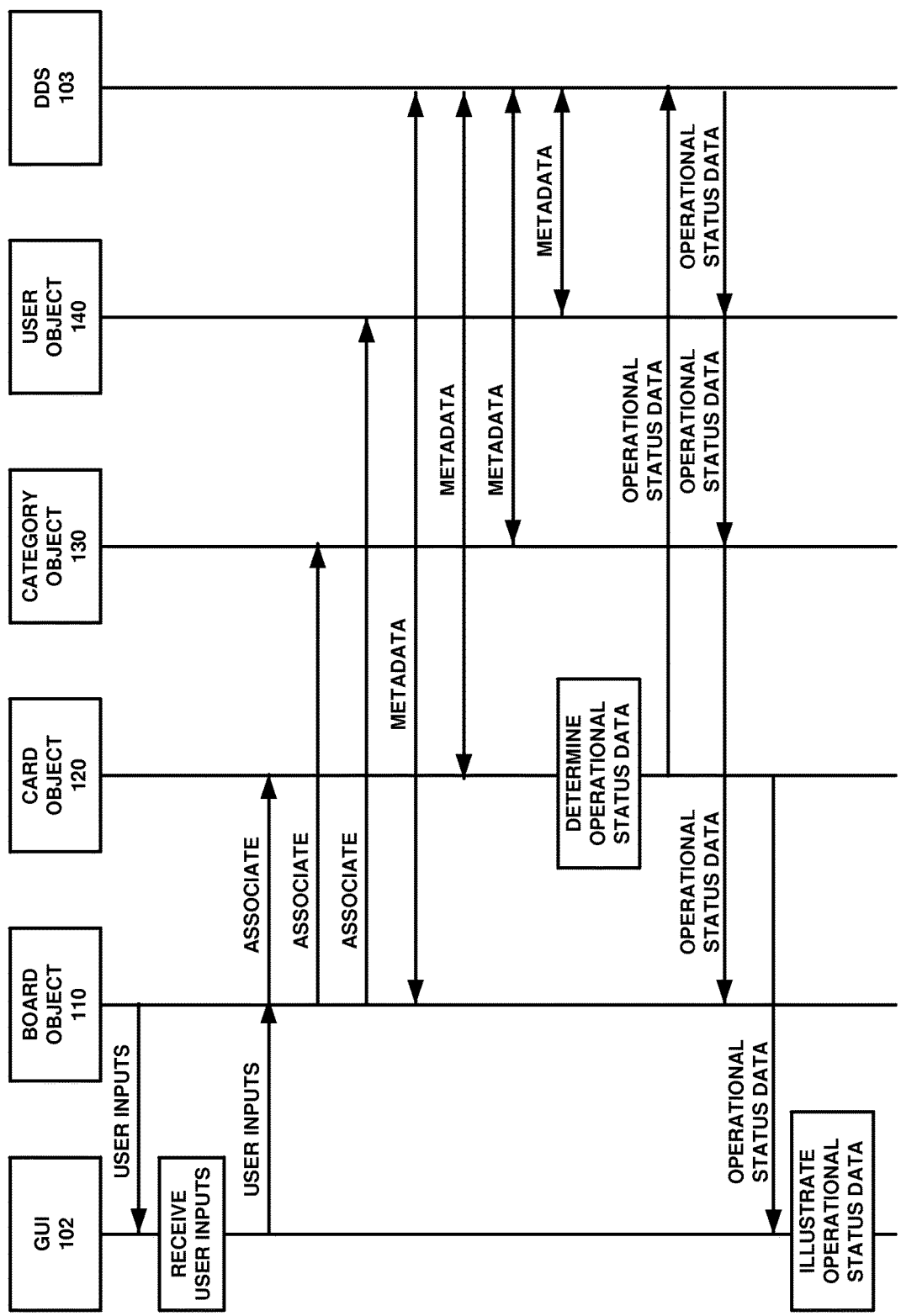

FIG. 3 illustrates a sequence diagram of a data processing system to illustrate the operational status of a monitored system. Data processing system 100 executes board object 110 to drive GUI 102 to receive user inputs for the monitored system, and responsive to the user inputs, to associate board object 110 with card object 120, category object 130, and user object 140 for the monitored system. Data processing system 100 executes board object 110, card object 120, category object 130, and user object 140 to drive DDS 103 to distribute the board metadata, the card metadata, the category metadata, and the user metadata among board object 110, card object 120, category object 130, and user object 140.

Data processing system 100 executes card object 120 to determine the operational status data for the monitored system based on the board metadata, the card metadata, the category metadata, and the user metadata. Next, data processing system 100 executes card object 120 to drive DDS 103 to distribute the operational status data among board object 110, category object 130, and user object 140. Data processing system 100 then executes card object 120 to drive GUI 102 to illustrate the operational status data for the monitored system. Advantageously, application 101 may drive DDS 103 to illustrate the operational status of the monitored system, and DDS 103 may be a standard and cost effective product.

Figure 4:
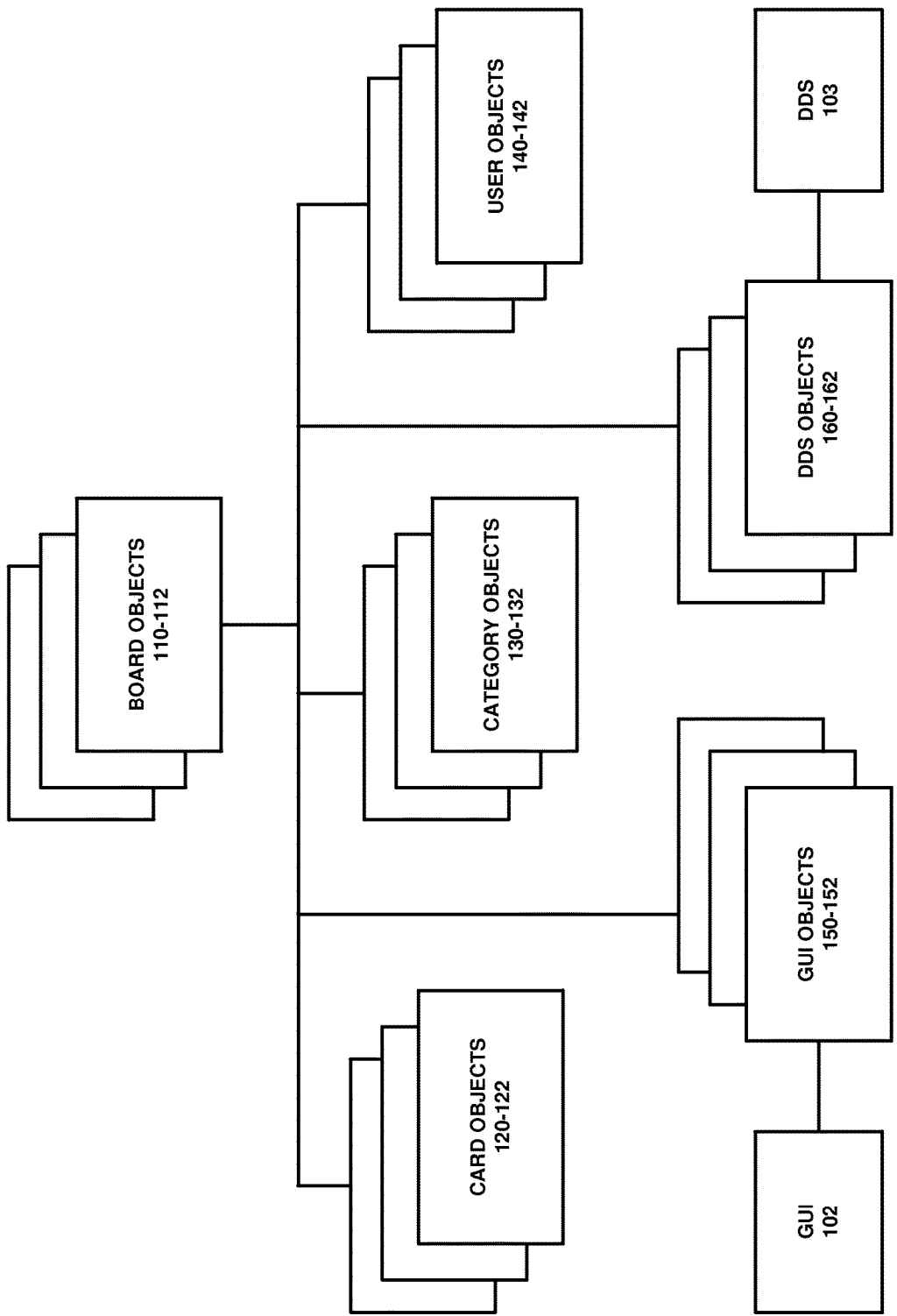

FIG. 4 is exemplary software architecture for data processing system 100 to illustrate the operational status of a monitored system. The software architecture contains board objects 110-112, card objects 120-122, category objects 130-132, user objects 140-142, GUI objects 150-152, DDS objects 160-162, GUI 102, and DDS 103. In this exemplary software architecture, board objects 110-122 associate card objects 120-122, category objects 130-132, user objects 140-142, GUI objects 150-152, and DDS objects 160-162. Board objects 110-122 and the GUI objects 150-152 drive GUI 102 to receive user inputs for the monitored system. Board objects 110-122, card objects 120-122, category objects 130-132, user objects 140-142, and DDS objects 160-162 drive DDS 103 to distribute the board metadata, the card metadata, the category metadata, and the user metadata among board objects 110-122, card objects 120-122, category objects 130-132, and user objects 140-142. Card objects 120-122 determine operational status data for the monitored system. Card objects 120-122 and DDS objects 160-162 drive DDS 103 to distribute the operational status data among board objects 110-112, card objects 120-122, category objects 130-132, and user objects 140-142.

Figure 5:
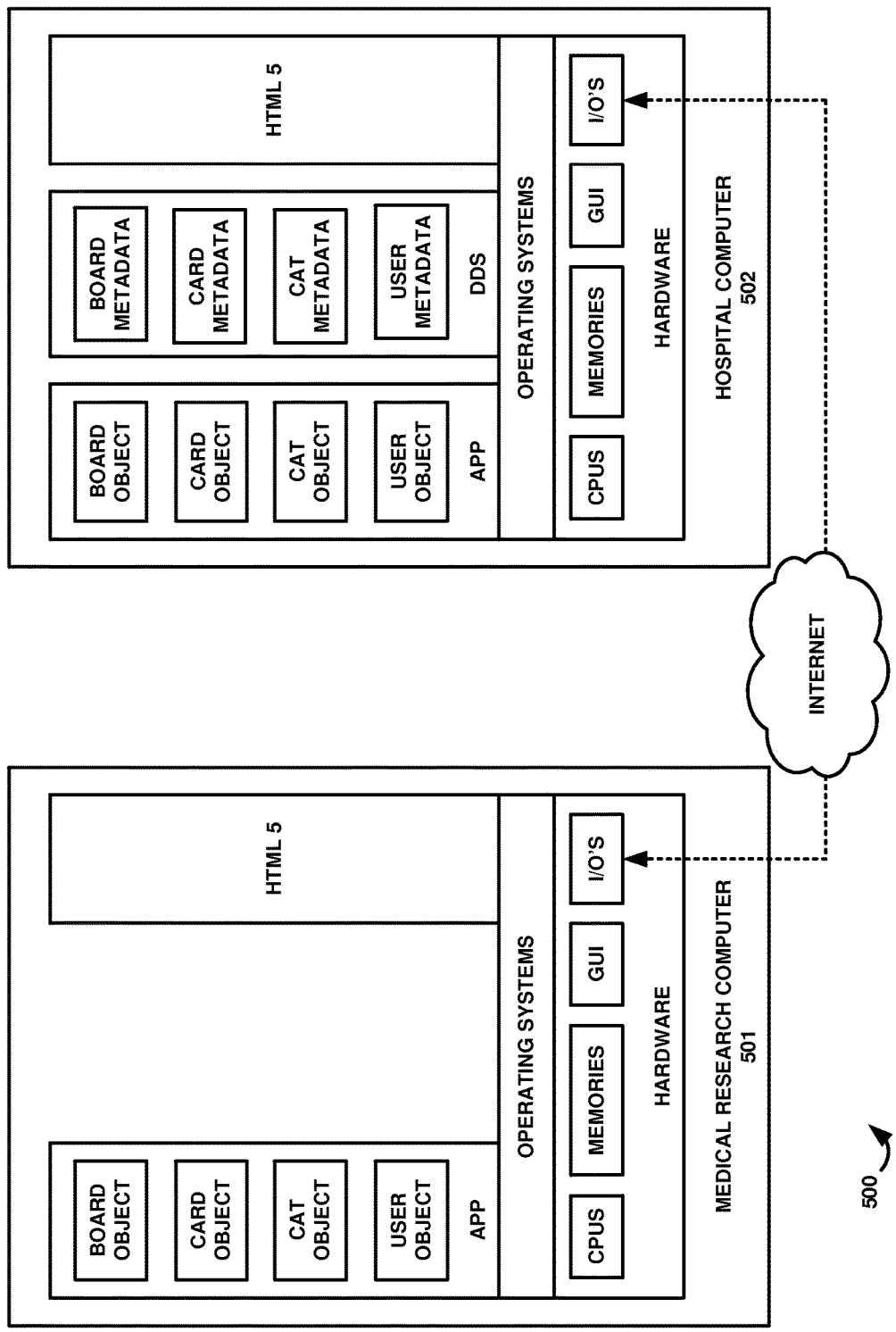
FIG. 5 illustrates a medical research computer to illustrate the operational status of a monitored system.

FIG. 5 is a system diagram illustrating data processing system 500 to illustrate the operational status of a monitored system. Data processing system 500 is an example of data processing system 100, although data processing system 100 may use alternative configurations and operations. Data processing system 500 includes medical research computer 501, hospital computer 502, and an internet network. Medical research computer 501 and hospital computer 502 comprise hardware, operating systems, an application, and Hyper-Text Markup Language (HTML) 5 software. Hospital computer 502 comprises DDS server software. The application comprises a board object, a card object, a category object, and a user object. DDS server software comprises board metadata, card metadata, category metadata, and user metadata. Hardware components include central processing units (CPUs), memories, input/outputs (I/Os), and GUIs. Medical research computer 501 and hospital computer 502 exchange data over the internet through respective I/Os.

FIG. 6 illustrates a computer to display the operational status of a monitored system. Computer 600 is an example of data processing system 100 and medical research computer 501, although data processing system 100 and medical research computer 501 may use alternative configurations and operations. Computer 600 includes GUI 601, network transceiver 602, and computer processing system 603. Computer processing system 603 is linked to GUI 601 and network transceiver 602.

GUI 601 comprises components that interact with a user such as a keyboard, display screen, microphone, touch pad, or some other user input/output apparatus. Network transceiver 602 comprises communication components, such as antennas, ports, amplifiers, filters, modulators, signal processors, and the like. It should be noted that computer 600 does not have a DDS included, but instead communicates with a DDS using network transceiver 602. Computer 600 may call DDS APIs through an OS integrated into a standard computer system.

Computer processing system 603 includes processing circuitry 604 and storage system 605 that stores software 606. Processing circuitry 604 comprises a microprocessor and other circuitry that retrieves and executes software 606 from storage system 605. Storage system 605 comprises a non-transitory storage medium, such as a disk drive, flash drive, data storage circuitry, or some other memory apparatus. Software 606 comprises computer programs, firmware, or some other form of machine-readable processing instructions. Software 606 includes object module 607, GUI module 608, DDS module 609, and OS module 610. Software 606 may further include an operating system, utilities, drivers, network interfaces, applications, or some other type of software. When executed by processing circuitry 604, software 606 directs computer processing system 603 to operate computer 600 as described herein.

In particular, when executed by processing circuitry 604, object module 607 directs processing circuitry 604 to receive user inputs from the GUI and associate a board object with a card object, a category object, and a user object for the monitored system. When executed by processing circuitry 604, object module 607 also directs processing circuitry 604 to execute the card object to determine operational status data for the monitored system based on the board metadata, the card metadata, the category metadata, and the user metadata.

When executed by processing circuitry 604, GUI module 608 directs processing circuitry 604 to receive user inputs for the monitored system. When executed by processing circuitry 604, GUI module 608 also directs processing circuitry 604 to illustrate the operational status data for the monitored system.

When executed by processing circuitry 604, DDS module 609 directs processing circuitry 604 to drive the DDS to distribute board metadata, card metadata, category metadata, and user metadata among the board object, the card object, the category object, and the user object. When executed by processing circuitry 604, DDS module 609 also directs processing circuitry 604 to drive the DDS to distribute the operational status data among the board object, the card object, the category object, and the user object. When executed by processing circuitry 604, OS module 610 directs processing circuitry 604 to execute the board object, the card object, the category object, and the user object. When executed by processing circuitry 604, OS module 610 directs processing circuitry 604 to call DDS APIs.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a data processing system to illustrate operational status of a monitored system, the method comprising:
   executing a board object to drive a Graphical User Interface (GUI) to receive user inputs for the monitored system, and responsive to the user inputs, to associate the board object with a card object, a category object, and a user object for the monitored system;
   executing the board object, the card object, the category object, and user object to drive a Data Distribution System (DDS) to distribute board metadata, card metadata, category metadata, and user metadata among the board object, the card object, the category object, and the user object;
   executing the card object to determine operational status data for the monitored system based on the board metadata, the card metadata, the category metadata, and the user metadata;
   executing the card object to drive the DDS to distribute the operational status data among the board object, the category object, and the user object; and
   executing the card object to drive the GUI to illustrate the operational status data for the monitored system.

2. The method of claim 1 wherein the GUI illustrates the operational status data for the monitored system by displaying at least one of a current card object task log and a current category object task log.

3. The method of claim 1 wherein the GUI illustrates the operational status data for the monitored system by displaying progress measurement indicators.

4. The method of claim 1 wherein the GUI illustrates the operational status data for the monitored system by displaying at least one of a card object user assignment and a category object user assignment.

5. The method of claim 1 wherein the GUI illustrates the operational status data for the monitored system by displaying at least one of a card object entry modification and a category object entry modification.

6. The method of claim 1 wherein the card metadata comprises an operation list.

7. The method of claim 1 wherein the card metadata comprises a time limitation.

8. The method of claim 1 wherein the category metadata comprises phase performance values.

9. The method of claim 1 wherein the user metadata comprises user assignments.

10. The method of claim 1 wherein the user metadata comprises user subscriptions.

11. A data processing system to illustrate operational status of a monitored system, the method comprising:
    a Graphical User Interface (GUI);
    a computer processing system configured to execute a board object to drive the GUI to receive user inputs for the monitored system, and responsive to the user inputs, to associate the board object with a card object, a category object, and a user object for the monitored system;
    the computer processing system configured to execute the board object, the card object, the category object, and user object to drive a Data Distribution System (DDS) to distribute board metadata, card metadata, category metadata, and user metadata among the board object, the card object, the category object, and the user object;
    the computer processing system configured to execute the card object to determine operational status data for the monitored system based on the board metadata, the card metadata, the category metadata, and the user metadata;
    the computer processing system configured to execute the card object to drive the DDS to distribute the operational status data among the board object, the category object, and the user object; and
    the computer processing system configured to execute the card object to drive the GUI to illustrate the operational status data for the monitored system.

12. The data processing system of claim 11 wherein the GUI is configured to illustrate the operational status data for the monitored system by displaying at least one of a current card object task log and a current category object task log.

13. The data processing system of claim 11 wherein the GUI is configured to illustrate the operational status data for the monitored system by displaying progress measurement indicators.

14. The data processing system of claim 11 wherein the GUI is configured to illustrate the operational status data for the monitored system by displaying at least one of a card object user assignment and a category object user assignment.

15. The data processing system of claim 11 wherein the GUI is configured to illustrate the operational status data for the monitored system by displaying at least one of a card object entry modification and a category object entry modification.

16. The data processing system of claim 11 wherein the card metadata comprises an operation list.

17. The data processing system of claim 11 wherein the card metadata comprises a time limitation.

18. The data processing system of claim 11 wherein the category metadata comprises phase performance values.

19. The data processing system of claim 11 wherein the user metadata comprises user assignments.

20. The data processing system of claim 11 wherein the user metadata comprises user subscriptions.

* * * * *